(12) United States Patent
Shi

(10) Patent No.: US 9,980,306 B2
(45) Date of Patent: May 22, 2018

(54) UE DEVICE AND METHOD

(71) Applicant: Shanghai Langbo Communication Technology Company Limited, Shanghai (CN)

(72) Inventor: Fei Shi, Shanghai (CN)

(73) Assignee: Shanghai Langbo Communication Technology Company Limited (CN)

( * ) Notice: Subject to any disclaimer, the term of this patent is extended or adjusted under 35 U.S.C. 154(b) by 23 days.

(21) Appl. No.: 15/025,085

(22) PCT Filed: Aug. 29, 2014

(86) PCT No.: PCT/CN2014/085496
§ 371 (c)(1),
(2) Date: Mar. 25, 2016

(87) PCT Pub. No.: WO2015/043357
PCT Pub. Date: Apr. 2, 2015

(65) Prior Publication Data
US 2016/0242219 A1 Aug. 18, 2016

(30) Foreign Application Priority Data
Sep. 26, 2013 (CN) .......................... 2013 1 0446296

(51) Int. Cl.
*H04W 76/02* (2009.01)
*H04W 4/00* (2018.01)
*H04W 8/00* (2009.01)

(52) U.S. Cl.
CPC ......... *H04W 76/023* (2013.01); *H04W 4/005* (2013.01); *H04W 8/005* (2013.01)

(58) Field of Classification Search
None
See application file for complete search history.

(56) References Cited

U.S. PATENT DOCUMENTS

2014/0003262 A1* 1/2014 He ..................... H04W 28/08
370/252
2014/0192735 A1* 7/2014 Sridharan, Sr. ......... H04W 8/26
370/329

(Continued)

FOREIGN PATENT DOCUMENTS

| CN | 102656907 A | 9/2012 |
|---|---|---|
| CN | 103179669 A | 6/2013 |
| WO | 2013052163 A1 | 4/2013 |

OTHER PUBLICATIONS

International Search Report and Written Opinion dated Dec. 9, 2014 from International Patent Application No. PCT/CN2014/085496 filed Aug. 29, 2014.

*Primary Examiner* — Candal Elpenord
(74) *Attorney, Agent, or Firm* — Stevens & Showalter, LLP

(57) ABSTRACT

The invention provides a solution for Discovery Signal (DS) in the device-to-device (D2D) communication, and includes a UE device and a method therefor. In an embodiment, the UE sends a DS to indicate configuration information through which a D2D communication connection can be established. The configuration information is suitable for a DS with a bit of information or a DS with a sequence. Through the technical solution provided in the invention, configuration information indicated by a DS can be minimized and the requirement of establishing a D2D communication connection can be satisfied in the meantime.

16 Claims, 3 Drawing Sheets

(56) References Cited

U.S. PATENT DOCUMENTS

| | | | | |
|---|---|---|---|---|
| 2015/0043483 A1* | 2/2015 | Sartori | ............... | H04W 72/02 |
| | | | | 370/329 |
| 2015/0043545 A1* | 2/2015 | Cheng | ............... | H04W 56/00 |
| | | | | 370/336 |
| 2016/0142898 A1* | 5/2016 | Poitau | ............... | H04W 72/0413 |
| | | | | 370/329 |

* cited by examiner

UE DEVICE AND METHOD

CROSS-REFERENCE TO RELATED APPLICATION

This application is a U.S. National Phase application under 35 U.S.C. § 371 of International Application No. PCT/CN2014/085496, filed on Aug. 29, 2014, and claims benefit to Chinese Patent Application No. CN 201310446296.5, filed on Sep. 26, 2013, all of which is hereby incorporated by reference for all purposes. The International Application was published in China on Apr. 2, 2015 as WO2015043357 A1 under PCT Article 21 (2).

BACKGROUND

Technical Field

The present invention is related to a Discovery Signal (DS) transmission scheme in D2D system, and more particular to a DS transmission scheme in Device-to-Device (D2D) configuration based on Long Term Evolution (LTE).

Related Art

The traditional LTE (Long Term Evolution) system of 3rd Generation Partner Project (3GPP) defines two frame structures, that is frame structure 1 of Frequency Division Duplex (FDD) system and frame structure 2 of Time Division Duplex (TDD) system. The difference between FDD and TDD lies in that each subframe of FDD frame structure is 1 millisecond, while the TDD system defines 1 to 2 special subframes in one frame (10 subframes). The special subframes are composed of a downlink synchronous time slot, a guard period and an uplink synchronization time slot.

In the traditional 3GPP version, the data transfer occurs between the base station and the user equipment (UE). In 3GPP R12, Device-to-Device (D2D) communication is approved and discussed. The essential characteristic of D2D is to allow data transfer between the UEs. For FDD and TDD system, 3GPP has concluded that the UE is not allowed to simultaneously receive and transmit in D2D system in the seventy-third meeting of Radio Access Network Working Group 1 (RAN1 #73). Furthermore, for avoiding the interference on D2D communication brought by the downlink data, the UE occupies the traditional uplink resource, i.e., the uplink frequency band of FDD and the uplink subframes of the subframes (TDD) are used for D2D communication (the TDD downlink subframe needs further discussion).

In the D2D system, the UE triggers the establishment of the D2D connection via receiving or transmitting Discovery Signal (DS). Besides indicating the existence of the D2D UE, DS may further carry information bits. According to the conclusion reached in the RAN1 #74 meeting of 3GPP, DS may be one or two of the following:

DS may include information composed by X information bits;

DS is a characteristic sequence, wherein the characteristic sequence is based on Physical Random Access Channel (PRACH), Sounding Reference Signal (SRS), and Primary/Secondary Synchronization Sequence (PSS/SSS). The PSS is a Zadoff-Chu sequence. The SSS is a pseudo-random sequence.

If the data packages composed by information bits are adopted, DS may carry more information such that the receiving UE of DS may directly initiate D2D communication without further information. However, the time synchronization and frequency synchronization requirement is higher for the way of adopting the data packages composed by information bits.

If the characteristic sequence is adopted, DS may merely carry less information such that the further information is likely to be required for the receiving UE of DS to initiate D2D communication. The time synchronization and frequency synchronization requirement is lower for the characteristic sequence.

No matter which approach is adopted, a solution is required for the information carried by DS to minimize the required information bits or candidate characteristic sequences. The present invention discloses a DS solution in D2D system.

SUMMARY

The present invention discloses a method used in UE, comprising the following steps:

mapping configured information to a DS, wherein the configured information includes at least one of the following:

first information: whether U1 is in the coverage of a service cell coverage;

second information: the service cell physical ID C_ID1 of the camping service cell of U1;

third information: the physical ID G_ID of the camping D2D group of U1;

fourth information: the index I_SF of the time-frequency resource block R1-included subframe among the S candidate subframes, which are within the current time window and can be used for the DS transmission;

transmitting the DS on the time-frequency resource block R1;

wherein the U1 is the transmitter of the DS, or the U1 is the head of the D2D group in which the transmitter of the DS camps, the time window is a periodic and continuous time window which is maintained by the U1, the indexes of the frames in the time window are from 0 to L−1, L is the maximum value of SFN plus 1, S is a positive integer not greater than 10 times of L, and the G_ID is an integer.

The value range of C_ID1 is an integer greater than or equal to 0, and less than or equal to 503. The L is 1024. The S is an integer greater than or equal to 1, and less than or equal to 10240. If the transmitter of the DS does not detect other D2D UE, the camping D2D group only includes a UE of the transmitter of the DS, i.e. U1 is the transmitter of the DS. For a centralized D2D scheduling, the U1 is the head of the Device-to-Device (D2D) group in which the transmitter of the DS camps. For a distributed D2D scheduling, the U1 is the transmitter of the DS. The frame is constituted by 10 subframes. The time length of each subframe is 1 ms.

The first information facilitates the selection of the D2D group. In one embodiment, UE selects to join the D2D group in the coverage of the service cell with a high priority. The second information also facilitates the selection of the D2D group. In one embodiment, UE selects to join the D2D group in the same service cell with a high priority. The third information facilitates indication of the resources used for D2D communication establishment. In one embodiment, the DS receiving UE determines the resources used for D2D communication request according to the third information. The forth information denotes frame synchronous information and subframe synchronous information. By using the forth information, the DS receiving UE may obtain the frame synchronization and the subframe synchronization within the time window simultaneously. A further synchronization information is not required to initiate the establishment of the D2D communication connection. The first information to the fourth information as mentioned above is the information with higher priority required for the establishment of the D2D communication connection, part or all of which are indicated by the DS. Besides, the configuration information may include other information, such as D2D service types, UE identification, etc. However, the other information may also be carried by other D2D signaling.

In one embodiment, the G_ID is one of the reserved values of Radio Network Temporary Identifier (RNTI). That is the value range of the G_ID is a hexadecimal value FFF4-FFFC.

In one embodiment, the method further comprises the followings steps:
receiving a communication request signal P on the time frequency resource block R2, wherein the R2 is a time frequency resource block after the R1, and the P includes at least one of the following:
fifth information: whether the U2 is in the coverage of the service cell or not;
sixth information: the service cell physical ID C_ID2 of the camping service cell of the U2;
wherein the U2 is the transmitter of the P.

In one embodiment, if the U1 is in the coverage of the service cell, the time window corresponds to the periodic time window identified by the SFN of the camping service cell of the U1.

In one embodiment, the DS is one particular sequence of the sequence set composed by Y candidate sequences, the configured information includes at least the first information and the third information, and the Y is an integer. The candidate sequences are the sequences based on PRACH sequence, SRS sequence or PSS/SSS sequence.

The joint indication of the first information and the third information can be fulfilled with the smaller required Y value. In one embodiment, the value range of the third information is a hexadecimal value FFF4-FFFC. Then Y being as 10 is capable of indicating the first information and the third information.

In one embodiment, the Y is one of the following:
504;
64;
16.

Wherein, 504 corresponds to the amount of the candidate sequences in PSS/SSS, 64 corresponds to the amount of the PRACH sequences in one service cell, and 16 corresponds to the amount of the SRS sequences in one symbol.

In one embodiment, the DS is a data package comprising X information bits, the configured information includes at least the first information, the second information, the third information and the fourth information, and the X is a positive integer.

In one embodiment, the positions of the S candidate subframes within the current time window are predefined.

In one embodiment, the coverage of the service cell is one of the following:
receiving at least one Reference Signal Receiving Power (RSRP) of the service cell that is greater than the first power;
receiving at least one Primary Synchronization Signal (PSS) and Secondary Synchronization Signal (SSS) of the service cell, wherein the power of PSS and SSS is greater than the second power;
correctly accessing at least one Mater Information Block (MIB) or SIB of the service cell;
wherein the first power is predetermined or configurable, the second power is predetermined or configurable.

In one embodiment, the first power is −136 dBm. In another embodiment, the second power is −112 dBm.

In one embodiment, the DS includes at least one of the following:
a Zadoff-Chu sequence;
a pseudo-random sequence;
a data package.

In one embodiment, the DS includes a Zadoff-Chu sequence, a pseudo-random sequence, and a data package.

In one embodiment, the subframe occupied by the R2 is the $K^{th}$ subframe after the subframe occupied by the R1, wherein the K is the integer times of the Physical Uplink Shared Channel (PUSCH) Round Trip Time (RTT). For a Frequency Division Duplex (FDD) system, RTT of PUSCH is 8, and the K is one of $\{8, 16, 24, 32,\}$. For a Time Division Duplex (TDD) system, RTT of PUSCH is determined by the structure of the Uplink reference frame thereof. The FDD system means that the R2 occupies the FDD frequency band. The TDD means that the R2 occupies the TDD frequency band.

The present invention discloses a method used in UE, comprising the following steps:
detecting Discovery Signal (DS) on the time-frequency resource block R1; and
determining configured information according to the DS, wherein the configured information comprises at least one of the following:
first information: whether U1 is in the coverage of a service cell or not;
second information: the service cell physical ID C_ID1 of the camping service cell of U1;
third information: the physical ID G_ID of the camping Device-to-Device (D2D) group of U1;
fourth information: the index of the time frequency resource block R1-included subframe among the S candidate subframes, which are within the current time window and can be used for the DS transmission;
wherein the U1 is the transmitter of the DS, or the U1 is the head of the D2D group in which the transmitter of the DS camps, the time window is a periodic and continuous time window which is maintained by the U1, the indexes of the frames in the time window are from 0 to L−1, L is the maximum value of SFN plus 1, S is a positive integer not greater than 10 times of L, and the G_ID is an integer.

In one embodiment, the method further comprises the followings steps:
transmitting a communication request signal P on the time frequency resource block R2, wherein the R2 is a time frequency resource block after the R1, and the P includes at least one of the following:
fifth information: whether the U2 is in the coverage of the service cell or not; and
sixth information: the service cell physical ID C_ID2 of the camping service cell of the U2;
wherein the U2 is the transmitter of the P.

In one embodiment, the DS is one particular sequence of the sequence set composed by Y candidate sequences, the configured information includes at least the first information and the third information, and the Y is an integer.

In one embodiment, the DS is a data package comprising X information bits, the configured information includes at least the first information, the second information, the third information and the fourth information, and the X is a positive integer.

In one embodiment, the coverage of the service cell is one of the following:
  receiving at least one RSRP of the service cell that is greater than the first power;
  receiving at least one PSS and SSS of the service cell, wherein the power of PSS and SSS is greater than the second power;
  correctly accessing at least one MIB or SIB of the service cell;
wherein the first power is predetermined or configurable, the second power is predetermined or configurable.

In one embodiment, the DS includes at least one of the following:
  a Zadoff-Chu sequence;
  a pseudo-random sequence;
  a data package.

The present invention discloses an user equipment (UE) device, the device comprising:
  a first module for mapping configured information to a DS, wherein the configured information includes at least one of the following:
    first information: whether U1 is in the coverage of a service cell or not;
    second information: the service cell physical ID C_ID1 of the camping service cell of U1;
    third information: the physical ID G_ID of the camping D2D group of U1;
    fourth information: the index of the time frequency resource block R1-included subframe among the S candidate subframes, which are within the current time window and can be used for the DS transmission;
  a second module for transmitting the DS on the time-frequency resource block R1;
wherein the U1 is the transmitter of the DS, or the U1 is the head of the D2D group in which the transmitter of the DS camps, the time window is a periodic and continuous time window which is maintained by the U1, the indexes of the frames in the time window are from 0 to L−1, L is the maximum value of SFN plus 1, S is a positive integer not greater than 10 times of L, and the G_ID is an integer.

In one embodiment, the above device further comprises:
  a third module for receiving a communication request signal P on the time frequency resource block R2, wherein the R2 is a time frequency resource block after the R1, and the P includes at least one of the following:
    fifth information: whether the U2 is in the coverage of the service cell or not;
    sixth information: the service cell physical ID C_ID2 of the camping service cell of the U2;
wherein the U2 is the transmitter of the P.

The present invention discloses an user equipment (UE) device, the device comprising:
  a first module for detecting a DS on the time-frequency resource block R1; and
  a second module for determining configured information according to the DS, wherein the configured information comprises at least one of the following:
    first information: whether U1 is in the coverage of a service cell or not;
    second information: the service cell physical ID C_ID1 of the camping service cell of U1;
    third information: the physical ID G_ID of the camping D2D group of U1;
    fourth information: the index of the time frequency resource block R1-included subframe among the S candidate subframes, which are within the current time window and can be used for the DS transmission;
wherein the U1 is the transmitter of the DS, or the U1 is the head of the D2D group in which the transmitter of the DS camps, the time window is a periodic and continuous time window which is maintained by the U1, the indexes of the frames in the time window are from 0 to L−1, L is the maximum value of SFN plus 1, S is a positive integer not greater than 10 times of L, and the G_ID is an integer.

In one embodiment, the above device further comprises:
  a third module for transmitting a communication request signal P on the time frequency resource block R2, wherein the R2 is a time frequency resource block after the R1, and the P includes at least one of the following:
    fifth information: whether the U2 is in the coverage of the service cell or not;
    sixth information: the service cell physical ID C_ID2 of the camping service cell of the U2;
wherein the U2 is the transmitter of the P.

The present invention designs the configured information indicates by DS in the D2D system. Through the configured information, the D2D communication connection is established. The configured information is suitable for the DS adopting information bits and the DS adopting sequence. Besides, the present invention reuses the existing system design as much as possible to maintain the maximum compatibility with existing systems.

BRIEF DESCRIPTION OF THE DRAWINGS

The other features, objectives and advantages of the present invention will be more apparent from the following description made for non-limitative embodiments the taken in conjunction with the accompanying drawings, in which.

DETAILED DESCRIPTION

The following specific embodiments are provided to illustrate the present invention in details. The following embodiments will help to those having ordinary skills in the art to further understand the invention, but not limit the present invention in any forms. It should be pointed out that, for those having ordinary skills in the art, the various modification and improvements may be conducted without departing from the spirit of the present invention. All of these belong to the protection scope of the present invention. "One embodiment" mentioned in the specification does not necessarily refer to the same embodiment.

Embodiment I

Figure 1:
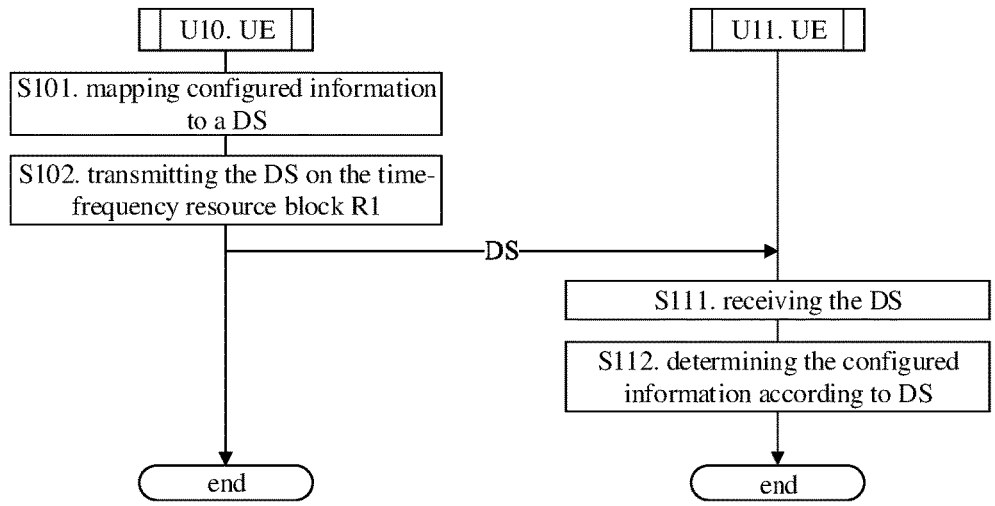
FIG. 1 illustrates the flow chart for receiving and transmitting DS according to one embodiment of the present invention.

Embodiment I illustrates the flow chart for receiving and transmitting DS, as shown in FIG. 1

For UE 10, in the step S101, configured information is mapped to a DS, wherein the configured information includes at least one of the following:
first information: whether UE10 is in the coverage of a service cell or not;
second information: the service cell physical ID C_ID1 of the camping service cell of UE10;
third information: the physical ID G_ID of the camping D2D group of UE10;
fourth information: the index of the time frequency resource block R1-included subframe among the S candidate subframes, which are within the current time window and can be used for the DS transmission.

In the step S102, the DS on the time-frequency resource block R1 is transmitted.

For UE11, in the step S111, the DS on the time-frequency resource block R1 is detected. In the step S112, configured information is determined according to the DS, wherein the configured information comprises at least one of the following:
first information: whether U10 is in the coverage of a service cell or not;
second information: the service cell physical ID C_ID1 of the camping service cell of U10;
third information: the physical ID G_ID of the camping D2D group of U10;
fourth information: the index I_SF of the time frequency resource block R1-included subframe among the S candidate subframes, which are within the current time window and can be used for the DS transmission.

In Embodiment I, the time window is a periodic and continuous time window which is maintained by the U10. The indexes of the frames in the time window are from 0 to 1023. S is a positive integer not greater than 10240. The G_ID is an integer.

Embodiment II

Figure 2:
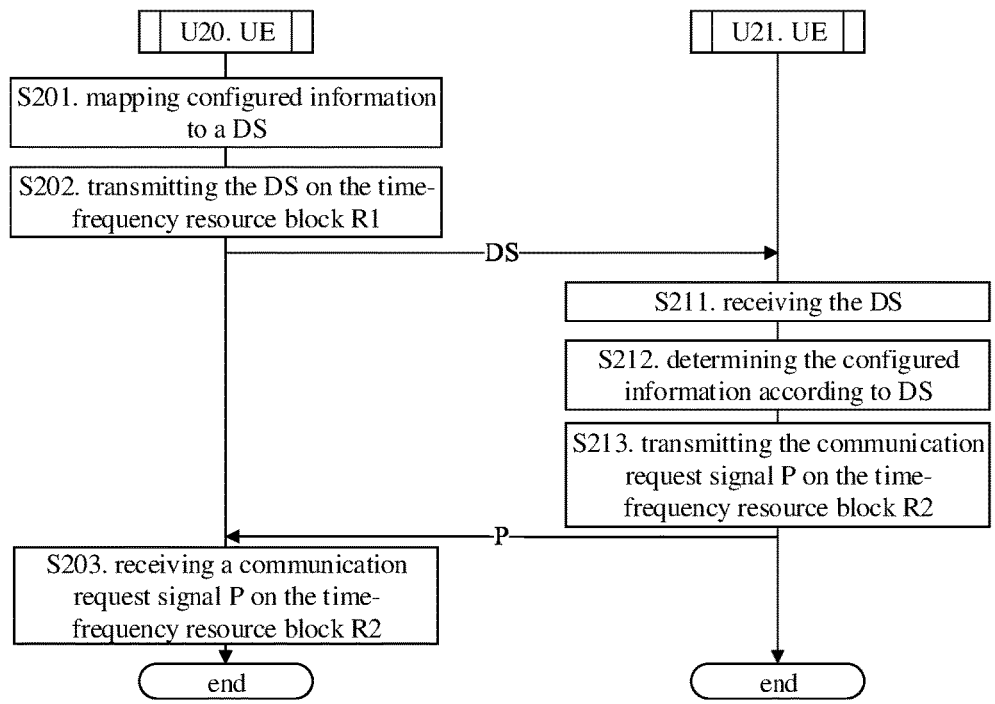
FIG. 2 illustrates the flow chart for transmitting the D2D communication request based on the DS configured information according to one embodiment of the present invention.

For the technical personnel in this field, Embodiment II may be appreciated as a preferred embodiment of Embodiment I. Embodiment II illustrates the flow chart for transmitting the D2D communication request based on the DS configured information, as shown in FIG. 2.

For UE20, in the step S201, the configured information is mapped to the Discovery Signal (DS), wherein the configured information at least includes:
whether the U20 is in the coverage of the service cell;
the physical ID G_ID of the camping Device-to-Device (D2D) group of the U20.

In the step S202, the DS is transmitted on the time-frequency resource block R1. In the step S203, the communication request signal P is received on time-frequency resource block R2. The R2 is a time frequency resource block after the R1, and the P includes at least one of the following:
whether the U20 is in the coverage of the service cell;
the service cell physical ID C_ID2 of the camping service cell of the U20.

For UE21, in the step S211, the Discovery Signal (DS) is detected on the time frequency resource block R1. In the step S212, the configured information is determined according to the DS, wherein the configured information at least includes:
whether the U20 is in the coverage of the service cell;
the physical ID G_ID of the camping Device-to-Device (D2D) group of the U20.

In the step S213, the communication request signal P is transmitted on the time frequency resource block R2. The R2 is a time frequency resource block after the R1, and the P includes at least one of the following:
whether the U21 is in the coverage of the service cell;
the service cell physical ID C_ID2 of the camping service cell of the U21.

In Embodiment II, the time window is a periodic continuous time window maintained by UE20. The indexes of the frames of the time window are from 0 to 1023. If UE20 is in the coverage of the service cell, the time window corresponds to the periodic time window identified by SFN of the camping service cell of UE20. The S is a positive integer not greater than 10240. The G_ID is an integer. The DS is a particular sequence of the sequence set composed by Y candidate sequences. The Y is a positive integer. The mapped configured information is selecting an appropriate sequence from the Y candidate sequences as the DS.

Embodiment III

Embodiment III illustrates the subframes allowed to transmit the DS in a time window. In Embodiment III, the transmitting UE first maps the configured information to Discovery Signal (DS). The configured information at least includes:
first information: whether the transmitting UE is in the coverage of a service cell;
second information: the service cell physical ID C_ID1 of the camping service cell of the transmitting UE;
third information: the physical ID G_ID of the camping Device-to-Device (D2D) group of the transmitting UE;
fourth information: the index I_SF of the time frequency resource block R1-included subframe among the S candidate subframes, which are within the current time window and can be used for the DS transmission.

Then the transmitting UE transmits the DS on the time frequency resource block R1, and then the transmitting UE receives a transmitting UE, wherein the R2 is a time frequency resource block after the R1, and the P includes at least one of the following:
whether the transmitter of the P is in the coverage of the service cell;
the service cell physical ID C_ID2 of the camping service cell of the transmitter of the P.

Figure 3:
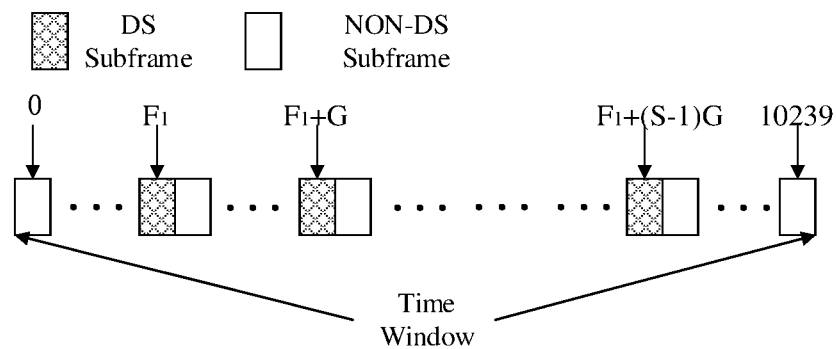
FIG. 3 illustrates the schematic diagram for the subframes allowed for transmitting DS in one time window according to one embodiment of the present invention.

In Embodiment III, the time window is a periodic continuous time window maintained by the transmitting UE. The indexes of the frames of the time window are from 0 to 1023. The G_ID is an integer. The DS is a data package including X information bits. The X is a positive integer. The mapped configured information is mapping the configured information to the information bits of the DS. The positions of the S candidate subframes are distributed at equal intervals in the time window, as shown by the grids in FIG. 3. The interval is a positive integer G. The index of the first candidate subframe in the time window is F1. The G and the F1 is predefined.

If UE 20 is in the coverage of the service cell, the time window corresponds to the periodic time window identified by SFN of the camping service cell of UE 20. The S is a positive integer not greater than 10240. The G_ID is an integer. The DS is a particular sequence of the sequence set composed by Y candidate sequences. The Y is a positive integer. The mapped configured information is selecting an appropriate sequence from the Y candidate sequences as the DS.

Embodiment IV

Figure 4:
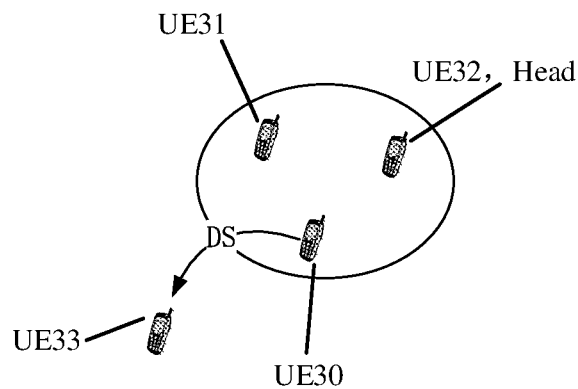
FIG. 4 illustrates the schematic diagram for a UE that is not a head transmitting DS according to one embodiment of the present invention.

Embodiment IV illustrates the schematic diagram for the UE that is not a head transmitting DS, as shown in FIG. 4.

In FIG. 4, UE30, UE31 and UE32 constitute D2D group, wherein UE 32 is a head, in charge of scheduling the D2D group.

For UE30, the configured information is mapped to Discovery Signal (DS), wherein the configured information includes at least one of the following:
 first information: whether UE32 is in the coverage of a service cell;
 second information: the service cell physical ID C_ID1 of the camping service cell of UE32;
 third information: the physical ID G_ID of the camping D2D group of UE32;
 fourth information: the index I_SF of the time frequency resource block R1-included subframe among the S candidate subframes, which are within the current time window and can be used for the DS transmission.

Then, the DS is transmitted on the time-frequency resource block R1.

For UE 33, Discovery Signal (DS) is first detected on the time-frequency resource block R1. Then the configured information is determined according to the DS, wherein the configured information includes at least one of the following:
 first information: whether the head of the D2D group at which UE30 camps is in the coverage of a service cell;
 second information: the service cell physical ID C_ID1 of the camping service cell of the head of the D2D group at which UE30 camps;
 third information: the physical ID G_ID of the camping Device to Device (D2D) group of the head of the D2D group at which UE30 camps;
 fourth information: the index I_SF of the time frequency resource block R1-included subframe among the S candidate subframes, which are within the current time window and can be used for the DS transmission.

In Embodiment IV, the time window is a periodic continuous time window maintained by the transmitting UE32. The indexes of the frames of the time window are from 0 to 1023. The G_ID is an integer.

Embodiment V

Figure 5:
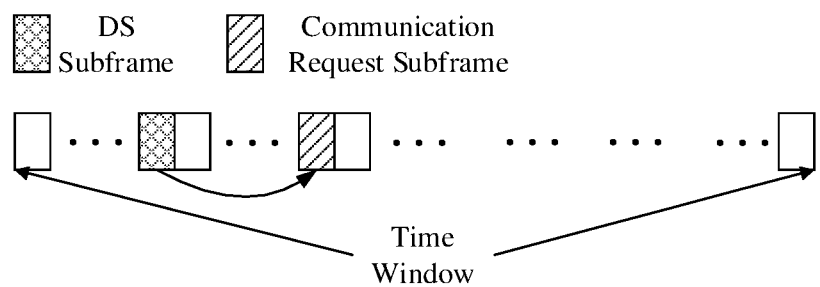
FIG. 5 illustrates the schematic diagram for the timing relationship between the DS subframes and the corresponding communication request subframes according to one embodiment of the present invention.

Embodiment V illustrates the schematic diagram for the timing relationship between the DS subframes and the corresponding communication request subframes, as shown in FIG. 5. In Embodiment V, the transmitting UE first maps the configured information to Discovery Signal (DS). Then the DS is transmitted on the time-frequency resource block R1, as shown by the squares labeled by the grids. Then a communication request signal P is received on the time frequency resource block R2, as shown by the squares labeled by the slash lines. The R2 is the Kth subframe after R1. The K is integer times of RTT of PUSCH.

Figure 6:
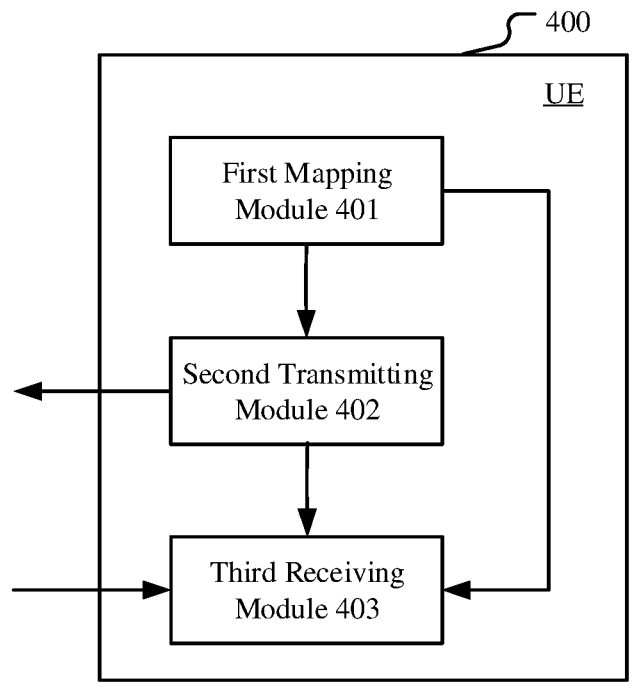
FIG. 6 illustrates the block diagram of the DS transmitting device in an user equipment according to one embodiment of the present invention.

Embodiment VI illustrates the block diagram of the DS transmitting processing device in the user equipment, as shown in FIG. 6. In FIG. 6, the first processing device 400 in UE includes a first mapping module 401, a second transmitting module 402, and a third receiving module 403. The first mapping module 401 maps the configured information to Discovery Signal (DS). The second transmitting module 402 transmits the DS on the time-frequency resource block R1. The third receiving module 403 receives a communication request signal P on the time frequency resource block R2. Wherein the configured information includes at least one of the following:
 first information: whether U1 is in the coverage of a service cell;
 second information: the service cell physical ID C_ID1 of the camping service cell of U1;
 third information: the physical ID G_ID of the camping D2D group of U1;
 fourth information: the index I_SF of the time frequency resource block R1-included subframe among the S candidate subframes, which are within the current time window and can be used for the DS transmission.

The U1 is the transmitter of the DS, or the U1 is the head of the Device-to-Device (D2D) group in which the transmitter of the DS camps. The time window is a periodic and continuous time window which is maintained by the U1. The indexes of the frames in the time window are from 0 to L−1. L is the maximum value of System Frame Number (SFN) plus 1. S is a positive integer not greater than 10 times of L, and the G_ID is an integer.

The R2 is a time frequency resource block after the R1, and the P includes at least one of the following:
 fifth information: whether the U2 is in the coverage of the service cell;
 sixth information: the service cell physical ID C_ID2 of the camping service cell of the U2;
wherein the U2 is the transmitter of the P.

Embodiment VII

Figure 7:
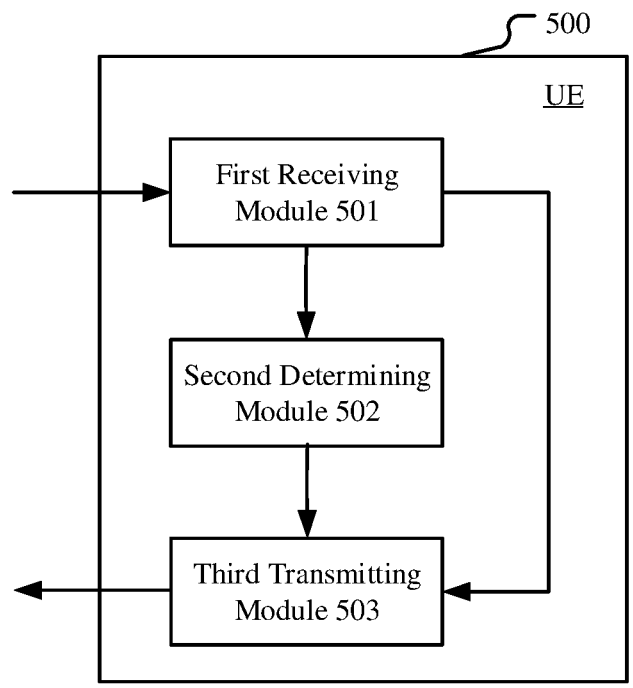
FIG. 7 illustrates the block diagram of the DS receiving device in an user equipment according to one embodiment of the present invention.

Embodiment VII illustrates the block diagram of the DS receiving processing device in the user equipment, as shown in FIG. 7. In FIG. 7, the second processing device 500 in UE includes a first receiving module 501, a second determining module 502, and a third transmitting module 503.

The first receiving module 501 detects a Discovery Signal (DS) on the time-frequency resource block RE The second determining module 502 determines the configured information according to the DS, wherein the configured information comprises at least one of the following:
 first information: whether U1 is in the coverage of a service cell;
 second information: the service cell physical ID C_ID1 of the camping service cell of U1;
 third information: the physical ID G_ID of the camping D2D group of U1;
 fourth information: the index I_SF of the time frequency resource block R1-included subframe among the S candidate subframes, which are within the current time window and can be used for the DS transmission.

Wherein the U1 is the transmitter of the DS, or the U1 is the head of the D2D group in which the transmitter of the DS camps, the time window is a periodic and continuous time window which is maintained by the U1, the indexes of the frames in the time window are from 0 to L−1, L is the maximum value of System Frame Number (SFN) plus 1, S is a positive integer not greater than 10 times of L, and the G_ID is an integer.

The third transmitting module 503 transmits a communication request signal P on the time frequency resource block R2, wherein the R2 is a time frequency resource block after the R1, and the P includes at least one of the following:

fifth information: whether the U2 is in the coverage of the service cell or not; and sixth information: the service cell physical ID C_ID2 of the camping service cell of the U2;

wherein the U2 is the transmitter of the P.

Further, in a preferred embodiment of Embodiment Vi or Embodiment VII, UE may include the first processing device 400 and the second processing device 500 such that the same UE device may have the function of being as the DS transmitter and the P transmitter.

Those having ordinary skills in the art may understand all or part of the steps in the above method can be completed by the program to instruction related hardware. The program can be stored in a computer readable storage medium, such as a read-only memory, a hard disk or an optical disk, etc. Optionally, all or part of the embodiments of the above example s can be implemented using one or more integrated circuits. Accordingly, each module unit of the embodiment can be realized in the form of hardware, and can be realized by the software function module, and the application is not limited to the combination of the software and the hardware of any particular form.

The present invention is illustrated and described with reference to specific embodiment. It should be noted that the invention is not limited to the specific implementation mentioned above. Those skilled in the art may make various variation or modifications in the scope of the claims. This does not affect the substance of the present invention.

What is claimed is:

1. A method used in UE, comprising:
    generating a discovery signal (DS) including configured information, wherein the configured information includes both of the following:
        first information: whether U1 is in the coverage of a service cell or not; and
        fourth information: an index of a time frequency resource block R1-included subframe among S candidate subframes, which are within a current time window and are used for the DS transmission;
    transmitting the DS to another UE on the time-frequency resource block R1, so as to establish a Device-to-Device (D2D) communication connection;
    wherein the U1 is the transmitter of the DS, or the U1 is the head of a D2D group in which the transmitter of the DS camps, the time window is a periodic and continuous time window which is maintained by the U1, the indexes of frames in the time window are from 0 to L−1, L is the maximum value of System Frame Number (SFN) plus 1, S is a positive integer not greater than 10 times of L, and the G_ID is an integer of the D2D group.

2. The method according to claim 1, wherein further comprising the following steps:
    receiving a communication request signal P on a time frequency resource block R2, wherein the R2 is a time frequency resource block after the Ri11, and the P includes at least one of the following:
        fifth information: whether the U2 is in the coverage of the service cell; sixth information: the service cell physical ID C_ID2 of the camping service cell of the U2;
    wherein the U2 is the transmitter of the P.

3. The method according to claim 1, wherein if the U1 is in the coverage of the service cell, the time window corresponds to the periodic time window identified by the SFN of the camping service cell of the U1.

4. The method according to claim 1, wherein the DS is one particular sequence of a sequence set composed by Y candidate sequences, the configured information includes at least the first information and third information, and the Y is an integer; or the DS is a data package comprising X information bits, the configured information includes at least the first information, second information, the third information and the fourth information, and the X is a positive integer, wherein the second information: the service cell physical ID C ID1 of the camping service cell of U1
    and the third information: the physical ID G ID of the camping D2D group of U1.

5. The method according to claim 1, wherein positions of the S candidate subframes within the current time window are predefined.

6. The method according to claim 1, wherein the coverage of the service cell is one of the following:
    receiving at least one Reference Signal Receiving Power (RSRP) of the service cell that is greater than a first power;
    receiving at least one Primary Synchronization Signal (PSS) and Secondary Synchronization Signal (SSS) of the service cell, wherein the power of PSS and SSS is greater than a second power;
    correctly accessing at least one Mater Information Block (MIB) or System Information Block (SIB) of the service cell;
    wherein the first power is predetermined or configurable, the second power is predetermined or configurable.

7. The method according to claim 1, wherein the DS includes at least one of the following:
    a Zadoff-Chu sequence;
    a pseudo-random sequence;
    a data package.

8. A method used in UE, comprising:
    detecting a discovery signal (DS) received from another UE on the time-frequency resource block R1; and
    determining configured information according to the DS, so as to establish a Device-to-Device (D2D) communication connection, wherein the configured information comprises each of the following:
    first information: whether U1 is in the coverage of a service cell;
    second information: the service cell physical ID C_ID1 of the camping service cell of U1;
    third information: the physical ID G_ID of the camping D2D group of U1; and
    fourth information: an index of a time frequency resource block R1-included subframe among S candidate subframes, which are within a current time window and are used for the DS transmission;
    wherein the U1 is the transmitter of the DS, or the U1 is the head of the D2D group in which the transmitter of the DS camps, the time window is a periodic and continuous time window which is maintained by the U1, the indexes of frames in the time window are from 0 to L−1, L is the maximum value of System Frame Number (SFN) plus 1, S is a positive integer not greater than 10 times of L, and the G_ID is an integer of the D2D croup.

9. The method according to claim 8, wherein further comprising the following steps:
transmitting a communication request signal P on a time frequency resource block R2, wherein the R2 is a time frequency resource block after the R1, and the P includes at least one of the following:
fifth information: whether the U2 is in the coverage of the service cell or not; and
sixth information: the service cell physical ID C_ID2 of the camping service cell of the U2;
wherein the U2 is the transmitter of the P.

10. The method according to claim 8, wherein the DS is one particular sequence of a sequence set composed by Y candidate sequences, the configured information includes at least the first information and the third information, and the Y is an integer; or the DS is a data package comprising X information bits, the configured information includes at least the first information, the second information, the third information and the fourth information, and the X is a positive integer.

11. The method according to claim 8, wherein the coverage of the service cell is one of the following:
receiving at least one Reference Signal Receiving Power (RSRP) of the service cell that is greater than a first power;
receiving at least one Primary Synchronization Signal (PSS) and Secondary Synchronization Signal (SSS) of the service cell, wherein the power of PSS and SSS is greater than a second power;
correctly accessing at least one Mater Information Block (MIB) or System Information Block (SIB) of the service cell;
wherein the first power is predetermined or configurable, the second power is predetermined or configurable.

12. The method according to claim 8, wherein the DS includes at least one of the following:
a Zadoff-Chu sequence;
a pseudo-random sequence;
a data package.

13. An UE device, wherein comprising:
a first module for generating a discovery signal (DS) including configured information, wherein the configured information includes both of the following:
first information: whether U1 is in the coverage of a service cell or not; and
fourth information: an index of a time frequency resource block R1-included subframe among S candidate subframes, which are within a current time window and are used for the DS transmission;
a second module for transmitting the DS to another UE on the time-frequency resource block R1, so as to establish a Device-to-Device (D2D) communication connection;
wherein the U1 is the transmitter of the DS, or the U1 is the head of a D2D group in which the transmitter of the DS camps, the time window is a periodic and continuous time window which is maintained by the U1, the indexes of frames in the time window are from 0 to L−1, L is the maximum value of System Frame Number (SFN) plus 1, S is a positive integer not greater than 10 times of L, and the G_ID is an integer of the D2D group.

14. The device according to claim 13, wherein the device further comprises:
a third module for receiving a communication request signal P on a time frequency resource block R2, wherein the R2 is the time frequency resource block after the R1, and the P includes at least one of the following:
fifth information: whether the U2 is in the coverage of the service cell or not; sixth information: the service cell physical ID C_ID2 of the camping service cell of the U2;
wherein the U2 is the transmitter of the P.

15. An UE device, wherein comprising:
a first module for detecting a discovery signal (DS) received from another UE on a time-frequency resource block R1; and
a second module for determining configured information according to the DS, so as to establish a Device-to-Device (D2D) communication connection, wherein the configured information comprises at-least one each of the following:
first information: whether U1 is in the coverage of a service cell or not;
second information: the service cell physical ID C_ID1 of the camping service cell of U1;
third information: the physical ID G_ID of the camping D2D group of U1; and
fourth information: an index of the time frequency resource block R1-included subframe among S candidate subframes, which are within a current time window and are used for the DS transmission;
wherein the U1 is the transmitter of the DS, or the U1 is the head of the D2D group in which the transmitter of the DS camps, the time window is a periodic and continuous time window which is maintained by the U1, the indexes of frames in the time window are from 0 to L−1, L is the maximum value of System Frame Number (SFN) plus 1, S is a positive integer not greater than 10 times of L, and the G_ID is an integer of the D2D group.

16. The device according to claim 15, wherein the device further comprises:
a third module for transmitting a communication request signal P on a time frequency resource block R2, wherein the R2 is a time frequency resource block after the R1, and the P includes at least one of the following:
fifth information: whether the U2 is in the coverage of the service cell or not; and sixth information: the service cell physical ID C_ID2 of the camping service cell of the U2;
wherein the U2 is the transmitter of the P.

* * * * *

UNITED STATES PATENT AND TRADEMARK OFFICE
CERTIFICATE OF CORRECTION

PATENT NO. : 9,980,306 B2
APPLICATION NO. : 15/025085
DATED : May 22, 2018
INVENTOR(S) : Fei Shi

It is certified that error appears in the above-identified patent and that said Letters Patent is hereby corrected as shown below:

In the Specification

In the Description:
Column 3, Line 64, "at least one Mater Information Block..." should read --at least one Master Information Block...--

In the Claims

Column 11, Lines 60-61, delete ", and the G_ID is an integer of the D2D group"
Column 11, Line 66, "after the Rill," should read --after the R1,--
Column 12, Line 19, "physical ID C ID1," should read --physical ID C_ID1--
Column 12, Line 20, "physical ID G ID" should read --physical ID G_ID--
Column 12, Line 34, "at least one Mater Information Block" should read --at least one Master Information Block--
Column 13, Line 3, "D2D croup" should read --D2D group--
Column 13, Line 12, "physical ID C ID2," should read --physical ID C_ID2--
Column 13, Line 33, "at least one Mater Information Block" should read --at least one Master Information Block--
Column 14, Line 55, "cell physical ID C ID2" should read --cell physical ID C_ID2--

Signed and Sealed this
Eighteenth Day of June, 2019

Andrei Iancu
*Director of the United States Patent and Trademark Office*

UNITED STATES PATENT AND TRADEMARK OFFICE
CERTIFICATE OF CORRECTION

PATENT NO. : 9,980,306 B2
APPLICATION NO. : 15/025085
DATED : May 22, 2018
INVENTOR(S) : Fei Shi

Page 1 of 1

It is certified that error appears in the above-identified patent and that said Letters Patent is hereby corrected as shown below:

In the Claims

Column 14, Lines 4-5, Claim 13, delete ", and the G_ID is an integer of the D2D group"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*